(12) United States Patent
Tam

(10) Patent No.: US 8,015,230 B2
(45) Date of Patent: Sep. 6, 2011

(54) FAST MODULAR ZERO SUM AND ONES SUM DETERMINATION

(75) Inventor: Honkai Tam, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1124 days.

(21) Appl. No.: 11/760,553

(22) Filed: Jun. 8, 2007

(65) Prior Publication Data

US 2008/0307031 A1  Dec. 11, 2008

(51) Int. Cl.
  *G06F 7/00* (2006.01)
  *G06F 15/00* (2006.01)
(52) U.S. Cl. .................... 708/525; 708/210; 708/211
(58) Field of Classification Search .......... 708/700–714, 708/210–212
  See application file for complete search history.

(56) References Cited

U.S. PATENT DOCUMENTS

| | | | | |
|---|---|---|---|---|
| 4,924,422 A * | 5/1990 | Vassiliadis et al. | ........... | 708/210 |
| 4,947,359 A * | 8/1990 | Vassiliadis et al. | ........... | 708/210 |
| 5,020,016 A * | 5/1991 | Nakano et al. | ........... | 708/525 |
| 5,270,955 A * | 12/1993 | Bosshart et al. | ........... | 708/525 |
| 5,359,718 A * | 10/1994 | Phillips et al. | ........... | 708/233 |
| 5,367,477 A * | 11/1994 | Hinds et al. | ........... | 708/525 |
| 5,493,520 A * | 2/1996 | Schmookler et al. | ........... | 708/211 |
| 5,561,619 A * | 10/1996 | Watanabe et al. | ........... | 708/525 |
| 5,581,496 A * | 12/1996 | Lai et al. | ........... | 708/525 |
| 5,586,069 A * | 12/1996 | Dockser | ........... | 708/525 |
| 5,604,689 A * | 2/1997 | Dockser | ........... | 708/200 |
| 5,745,397 A * | 4/1998 | Nadehara | ........... | 708/552 |
| 5,831,884 A * | 11/1998 | Suzuki | ........... | 708/505 |
| 6,424,955 B1 * | 7/2002 | Wong | ........... | 708/525 |
| 6,560,622 B2 * | 5/2003 | Katano | ........... | 708/211 |
| 6,697,828 B1 * | 2/2004 | Ott | ........... | 708/211 |
| 2004/0153490 A1 * | 8/2004 | Talwar et al. | ........... | 708/700 |
| 2005/0210095 A1 * | 9/2005 | Lutz et al. | ........... | 708/700 |

OTHER PUBLICATIONS

Mark Hayter, "Zen and the Art of SOC Design," Microprocessor Summit 2006, Session MPS-960 High End Processors, P.A. Semi, Inc., 14 pages.
James B. Keller, "The PWRficient Processor Family," PA Semi, Oct. 2005, 31 pages.
Patterson, et al., "Computer Architecture A Quantitative Approach," Second Edition, Appendix A, Morgan Kaufmann Publishers, Inc., 1996.

* cited by examiner

*Primary Examiner* — Lewis Bullock, Jr.
*Assistant Examiner* — Matthew Sandifer
(74) *Attorney, Agent, or Firm* — Lawrence J. Merkel; Meyertons, Hood, Kivlin, Kowert & Goetzel, P.C.

(57) ABSTRACT

In one embodiment, a state determiner comprises a plurality of logic circuits and a second logic circuit. Each logic circuit corresponds to a respective bit position of a result of an adder. A first logic circuit corresponds to a least significant bit of the result and is coupled to receive a least significant bit of each operand of the adder and a carry-in input to the adder. Each remaining logic circuit is coupled to receive a bit from the respective bit position of each operand and a less significant bit adjacent to the bit of each operand. Each logic circuit generates an output signal indicative of whether or not a specific result occurs in the respective bit position of the result. Coupled to receive the output signals second logic circuit is configured to generate a sum signal indicative, when asserted, that the specific result occurs.

15 Claims, 4 Drawing Sheets

FAST MODULAR ZERO SUM AND ONES SUM DETERMINATION

BACKGROUND

1. Field of the Invention

This invention is related to processors and, more particularly, to arithmetic operations in processors.

2. Description of the Related Art

Processors are designed to execute instructions that can be categorized into several broad types: arithmetic, logic, control flow (or branch), load/store, etc. Arithmetic instructions include instructions that require an adder. For example, add or subtract instructions directly use the adder to generate the add/subtract result. Other instructions also use an adder indirectly. For example, multiply and/or divide instructions can be implemented, in part, using an adder. Additionally, load/store instructions can use an adder for adding address operands to produce the effective address to be read/written during execution of the load/store instruction. Arithmetic instructions can include both floating point and integer instructions. An adder can be used in the execution of both floating point and integer instructions, although different adder hardware is typically used for floating point versus integer execution. Similarly, a separate adder can be used for address generation for load/store instructions. More than one adder can be included for any type of instruction as well. While the present discussion refers to different instruction types, an arithmetic operation can be an implicit part of the instruction (e.g. the address generation mentioned above) and adder hardware can be used to perform the arithmetic operation.

Performing the complete addition typically requires numerous logic levels, and the attendant delay of evaluating those logic levels. The number of levels and delay tends to increase as the number of bits in the addition increases (e.g. 64 bit additions are common now in instruction set architectures that implement 64 bit integer instructions).

SUMMARY

In one embodiment, a state determiner for an adder is contemplated. The state determiner comprises a plurality of logic circuits and a second logic circuit. Each logic circuit corresponds to a respective bit position of a result of the adder. A first logic circuit of the plurality of logic circuits corresponds to a least significant bit of the result and is coupled to receive a least significant bit of each operand of the adder and a carry-in input to the adder. Each remaining logic circuit is coupled to receive a respective bit from the respective bit position of each operand and a less significant bit adjacent to the respective bit of each operand. Each logic circuit is configured to generate an output signal indicative of whether or not a specific result occurs in the respective bit position of the result responsive only to inputs that the logic circuit is coupled to receive as stated previously. Coupled to receive the output signals from the plurality of logic circuits, the second logic circuit is configured to generate a sum signal indicative, when asserted, that the specific result occurs in each bit position of the result of the adder. The specific result may be a one or a zero, in various embodiments.

BRIEF DESCRIPTION OF THE DRAWINGS

The following detailed description makes reference to the accompanying drawings, which are now briefly described.

Figure 1:
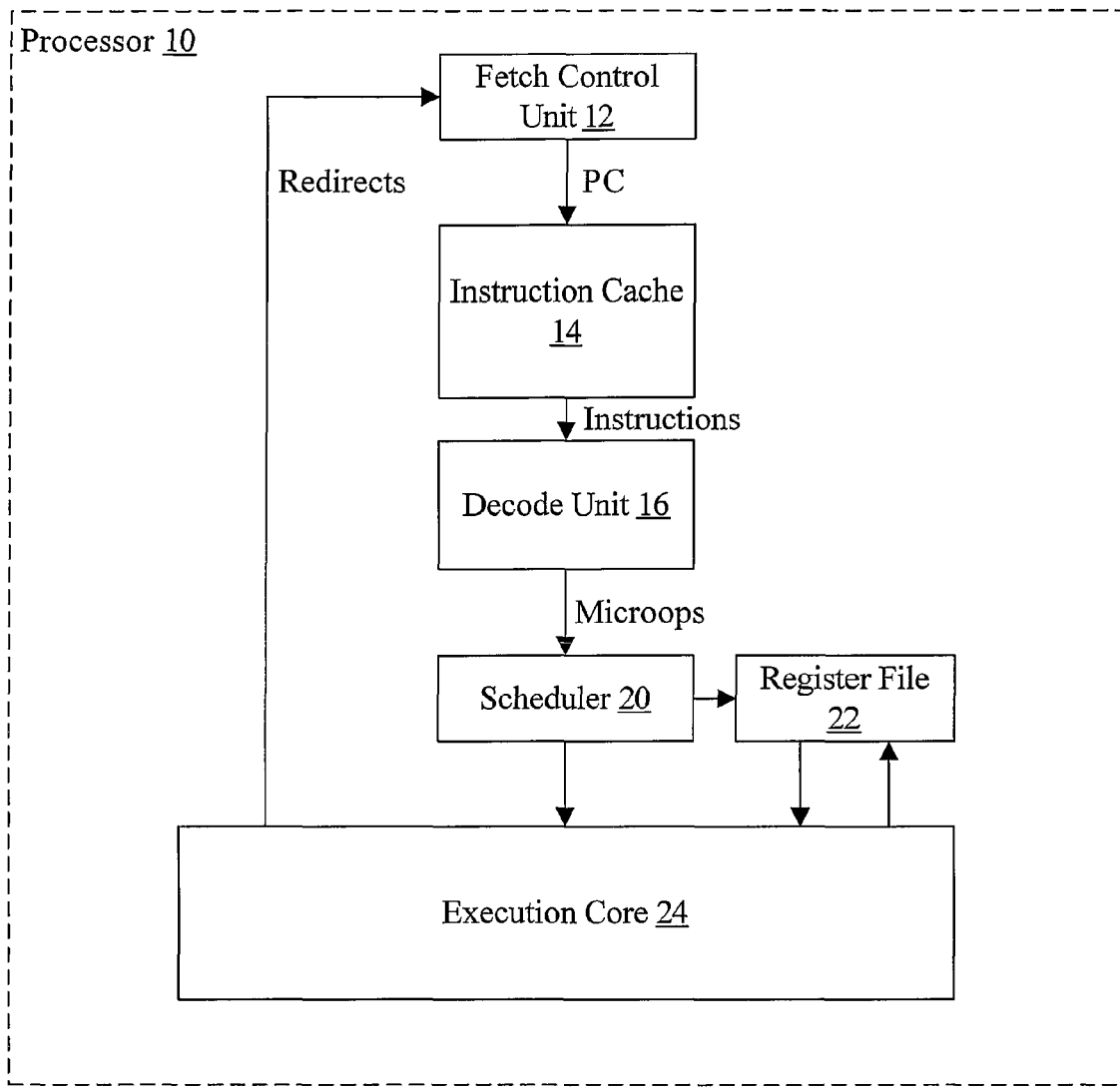
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a processor 10 is shown. In the illustrated embodiment, the processor 10 includes a fetch control unit 12, an instruction cache 14, a decode unit 16, a scheduler 20, a register file 22, and an execution core 24. The fetch control unit 12 is coupled to provide a program counter (PC) for fetching from the instruction cache 14, and is coupled to receive a redirect from the execution core 24. The instruction cache 14 is coupled to provide instructions to the decode unit 16, which is coupled to provide microops to the scheduler 20. The scheduler 20 is coupled is coupled to the register file 22, and is coupled to provide microops for execution to the execution core 24. The register file 22 is coupled to provide operands to the execution core 24 and to receive results from the execution core 24. It is noted that the PC of an instruction may be an address that locates the instruction itself in memory. That is, the PC is the address that may be used to fetch the instruction. The PC may be an effective or virtual address that is translated to the physical address actually used to access the memory, or may be a physical address, in various embodiments.

The decode unit 16 may be configured to generate microops for each instruction provided from the instruction cache 14. Generally, the microops may each be an operation that the hardware included in the execution core 24 is capable of executing. Each instruction may translate to one or more microops which, when executed, result in the performance of the operations defined for that instruction according to the instruction set architecture. The decode unit 16 may include any combination of circuitry and/or microcoding in order to generate microops for instructions. For example, relatively simple microop generations (e.g. one or two microops per instruction) may be handled in hardware while more extensive microop generations (e.g. more than three microops for an instruction) may be handled in microcode. The number of microops generated per instruction in hardware versus microcode may vary from embodiment to embodiment. Alternatively, each instruction may map to one microop executed by the processor. Accordingly, an operation (e.g. a shift operation) may be an operation derived from an instruction or may be a decoded instruction, as desired.

Microops generated by the decode unit 16 may be provided to the scheduler 20, which may store the microops and may schedule the microops for execution in the execution core 24. In some embodiments, the scheduler 20 may also implement register renaming and may map registers specified in the microops to registers included in the register file 22. When a microop is scheduled, the scheduler 20 may read its source operands from the register file 22 and the source operands may be provided to the execution core 24.

Among the microops executed by the execution core may be add/subtract operations and multiply/divide operations. The add/subtract operations may include operations to perform an address generation for load/store operations. These operations may have at least two source operands and may generate a result. An example using two source operands will be described in more detail below.

The execution core 24 may include one or more adders to perform add/subtract operations. The adders may generate the result. Additionally, it may be useful to determine if certain specific results are going to be generated by the adder, before the addition/subtraction operation is complete. For example, it may be useful to determine that the result is all binary zeros (a "zero result") or all binary ones (a "ones" result). These early indications may be used, e.g., for condition code generation, error detection, etc. The execution core 24 may include one or more determiner circuits that operate on the source operands in parallel with the adder, and may determine if a zero result or a ones result is going to be generated. In one embodiment, the determiner circuits may be fast, and may be implemented in static logic gates (as opposed to dynamic logic gates) to save power. Additional details are provided below.

The adders and zero/ones determiner circuits may be used for integer operations, floating point operations, and/or load/store address generation operations, in various embodiments. In addition to the adder circuitry, the execution core 24 may comprise other execution circuitry (e.g. additional integer and/or floating point arithmetic/logic unit (ALU) circuitry to handle other arithmetic/logic operations, one or more load/store units, one or more acceleration units (e.g. for vector instructions, cryptographic operations, etc.), etc.

The register file 22 may generally comprise any set of registers usable to store operands and results of microops executed in the processor 10. In some embodiments, the register file 22 may comprise a set of physical registers and the scheduler 20 may map the logical registers to the physical registers. The logical registers may include both architected registers specified by the instruction set architecture implemented by the processor 10 and temporary registers that may be used as destinations of microops for temporary results (and sources of subsequent microops as well). In other embodiments, the register file 22 may comprise an architected register set containing the committed state of the logical registers and a speculative register set containing speculative register state.

The fetch control unit 12 may comprise any circuitry used to generate PCs for fetching instructions. The fetch control unit 12 may include, for example, branch prediction hardware used to predict branch instructions and to fetch down the predicted path. The fetch control unit 12 may also be redirected (e.g. via misprediction, exception, interrupt, flush, etc.).

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in one embodiment. Other embodiments may use larger or smaller cache line sizes. In response to a given PC from the fetch control unit 12, the instruction cache 14 may output up to a maximum number of instructions. For example, up to 4 instructions may be output in one embodiment. Other embodiments may use more or fewer instructions as a maximum.

It is noted that, while the illustrated embodiment uses a scheduler, other embodiments may implement other microarchitectures. For example, a reservation station/reorder buffer microarchitecture may be used. If in-order execution is implemented, other microarchitectures without out of order execution hardware may be used.

Figure 2:
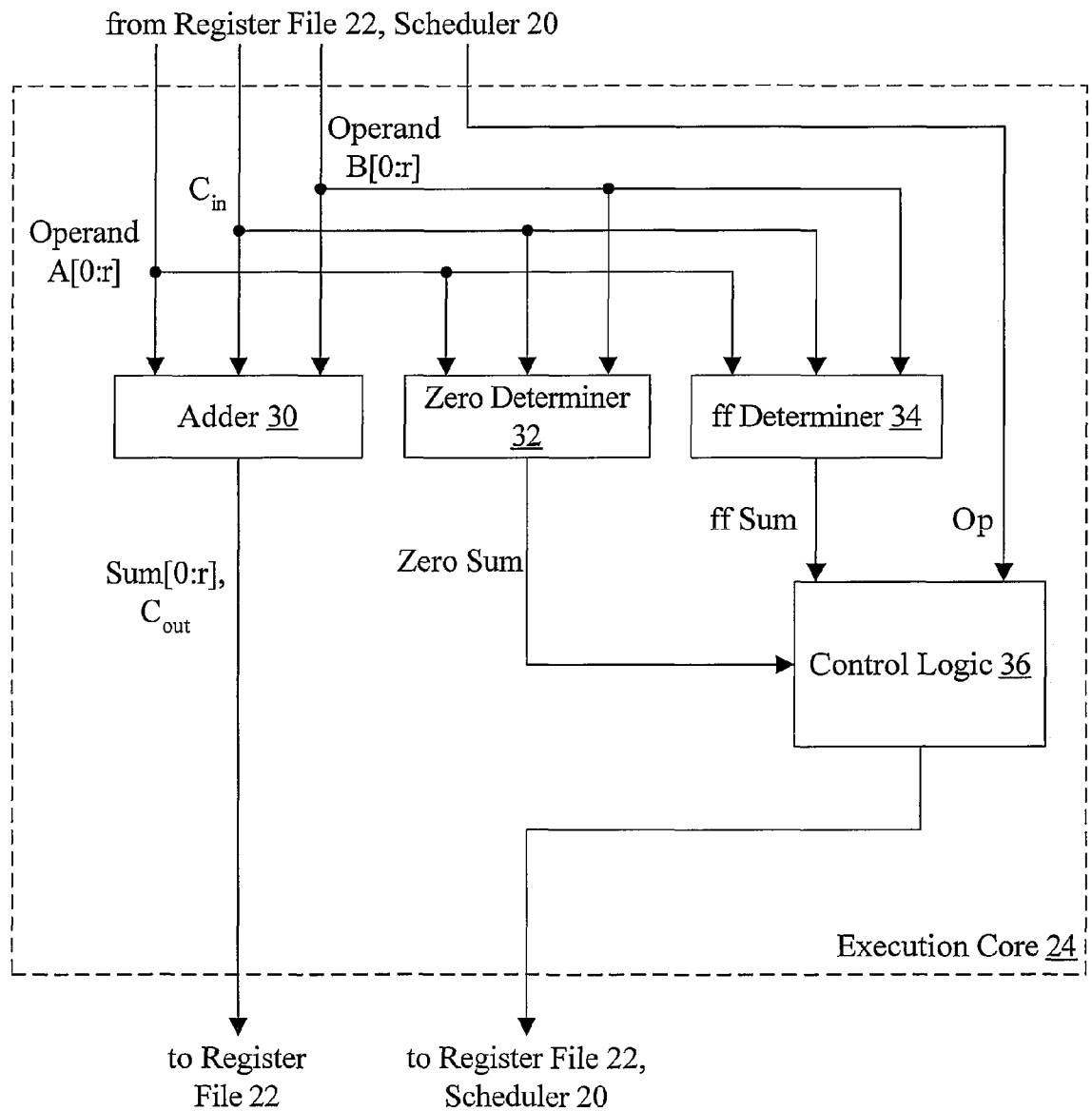
FIG. 2 is a block diagram of one embodiment of an execution core.

Turning now to FIG. 2, a block diagram of one embodiment of a portion of the execution core 24 is shown. In FIG. 2, an adder 30, a zero determiner circuit 32, a ones (ff) determiner circuit 34, and control logic 36 are shown. The adder 30, zero determiner circuit 32, ff determiner circuit 34, and control logic 36 may be an execution unit within the execution core 24, or may be part of an execution unit (e.g. an integer execution unit or floating point execution unit) that includes other hardware such as one or more multipliers, other logic operation circuitry, etc. The execution core 24 may include multiple instances of the adder 30, zero determiner circuit 32, ff determiner circuit 34, and control logic 36 in some embodiments. Various bit ranges are shown in FIG. 2 and some other figures. In this description, bit zero is the most significant bit and the bits decrease in significance with increasing bit numbers. Other embodiments may use the opposite bit numbering scheme, where bit 0 is the least significant bit and the bits increase in significance with increasing bit numbers.

The adder 30 is coupled to receive input operands for the addition (Operand A[0:r] and Operand B[0:r] in FIG. 2) as well as a carry-in ($C_{in}$) from the register file 22 and/or scheduler 20, and generates a sum[0:r] and a carry-out ($C_{out}$). The operands may be provided from the register file 22. The carry-in may be provided from a condition code register (which may be in the register file 22 or may be represented elsewhere and/or may be provided by the scheduler 20). Alternatively, the carry-in may be provided from a previous addition operation, locally forwarded within the execution core 24. Each of the determiner circuits 32 and 34 are coupled to receive the operands and carry-in as well. The operation that is scheduled for execution (Op in FIG. 2) may be provided to the control logic 36. The zero determiner circuit 32 is configured to output a zero sum signal to the control logic 36 and the ff determiner circuit 34 is configured to output a ones sum (ff sum) signal to the control logic 36. The control logic 36 may determine if the zero sum or ff sum signal is to be passed on (or manipulated in some form, such as for condition code generation) to the register file 22, the scheduler 20, and/or other circuitry in the execution core 24.

Figure 3:
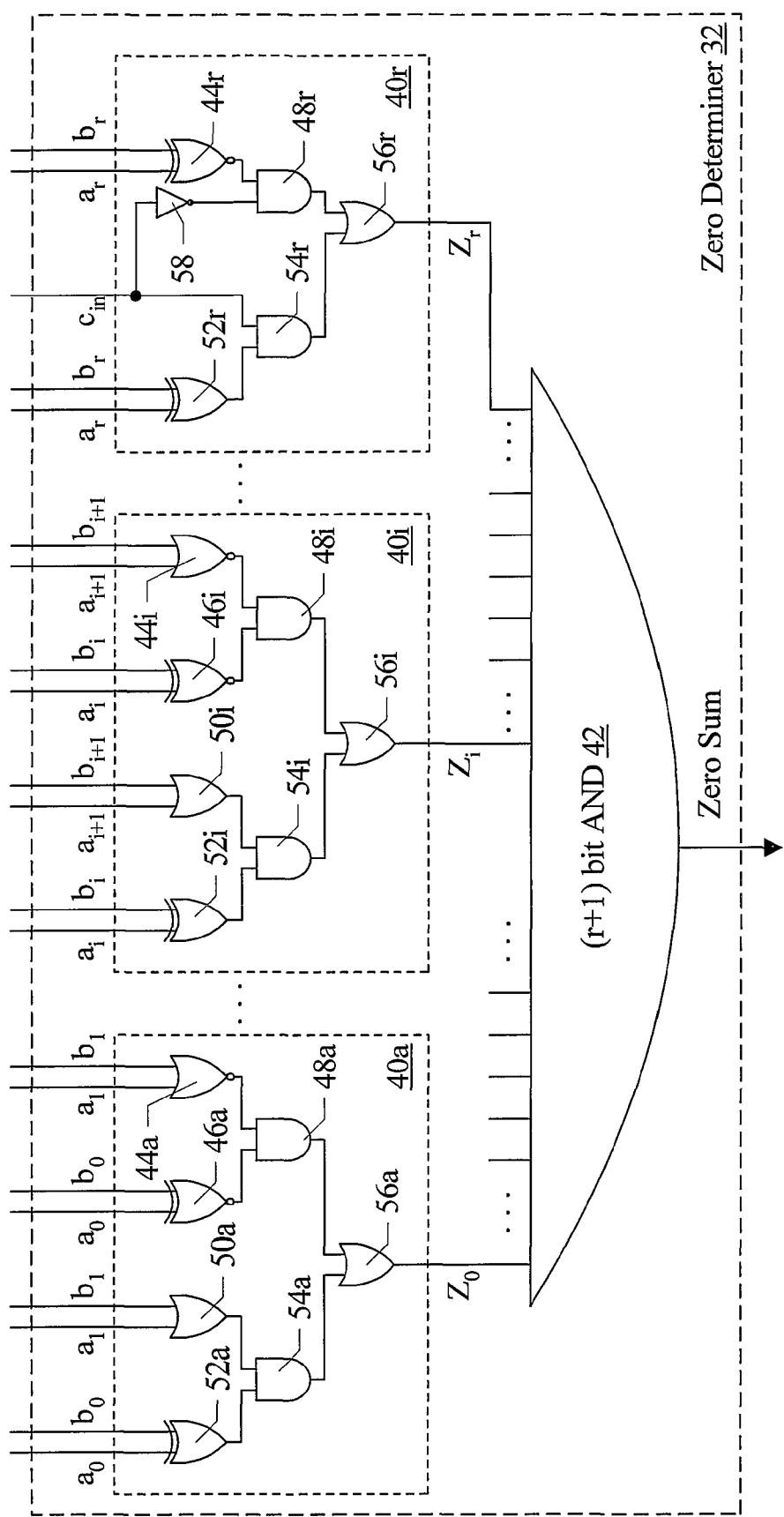
FIG. 3 is a block diagram of one embodiment of a zero determiner shown in FIG. 2.

The zero determiner circuit 32 is configured to operate on the operands and the carry-in to rapidly (e.g. compared to the generation of the result sum from the adder 30) determine if the result is going to be zero. One embodiment of the zero determiner circuit 32 is shown in FIG. 3 and described in more detail below. If the zero determiner circuit 32 determines that a zero result is going to be generated by the adder 30, the zero determiner circuit 32 may assert the zero sum signal.

Figure 4:
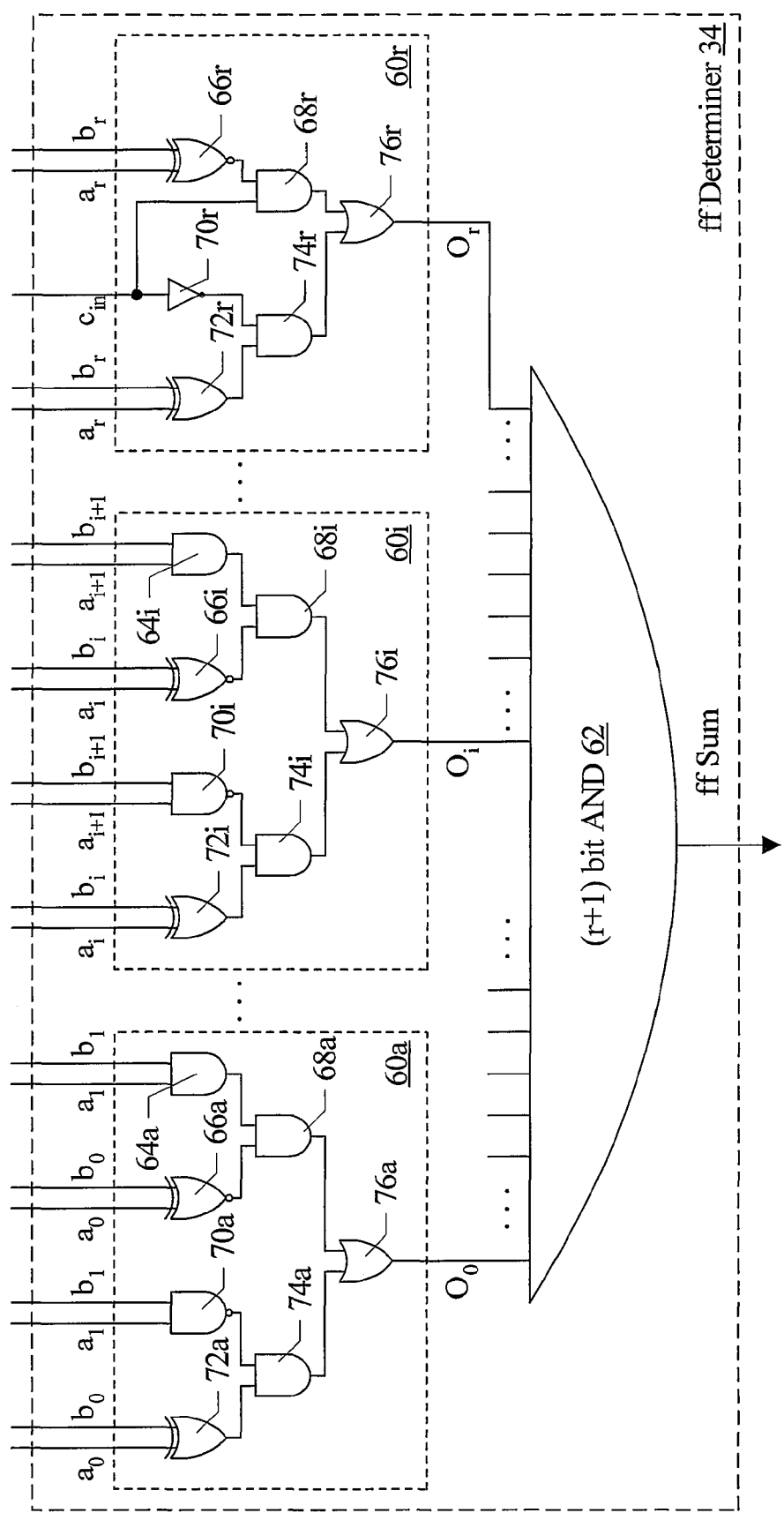
FIG. 4 is a block diagram of one embodiment of an ff determiner shown in FIG. 2.

Similarly, the ff determiner circuit 34 is configured to operate on the operands and the carry-in to rapidly determine if the result is going to be all ones. One embodiment of the ff determiner circuit 34 is shown in FIG. 4 and described in more detail below. If the ff determiner circuit 34 determines that a ones result is going to be generated by the adder 30, the ff determiner circuit 34 may assert the ff sum signal.

Generally, a signal may be "asserted" in the high (logical one) or low (logical zero) state. The signal may be "deasserted" in the other logical state. Different logic circuitry may be implemented in the determiner circuits 32 and/or 34 dependent on which state is defined to be asserted, which may permit more efficient logic to be implemented.

In various embodiments, the number of bits in the input operand may vary. For example, in one embodiment, the number of bits may be 64 (r is 63). Other embodiments may have 32 bits in the input operand (r is 31), 128 bits (r is 127), or any other desired size.

FIG. 3 is a block diagram of one embodiment of the zero determiner circuit 32. In the illustrated embodiment, the zero determiner circuit 32 includes a plurality of logic circuits 40a-40r and a second logic circuit 42. Specifically, there may be one logic circuit 40a-40r for each bit position in the result (and the source operands, in this embodiment). The logic circuit 40a-40r may detect whether or not a zero result occurs for the respective bit position, assuming that each other bit position has a zero result. The logic circuit 40a-40r may assert an output signal $Z_0$-$Z_r$ to the second logic circuit 42 to indicate that the zero result is detected at that bit position. The second logic circuit 42 may combine the output signals $Z_0$-$Z_r$ to generate the zero sum signal. That is, the second logic circuit 42 may verify that each bit position is zero. Assertion of the zero sum signal indicates that the sum generated by the adder 30 will be zero.

In FIG. 3, the bits of operand A are illustrated as "a" followed by a subscript indicating which bit position of the operand is provided (positions 0 through r). Similarly, bits of operand B are illustrated as "b" followed by a subscript indicating the bit position. Accordingly, as can be seen in FIG. 3, each logic circuit 40a-40r is coupled to receive the bit of each operand from the bit position that corresponds to that logic circuit 40a-40r (the "respective bit position") and a less significant, adjacent bit position to the respective bit position (the "next less significant bit position"). Thus, for example, logic circuit 40a corresponds to bit position 0 and thus receives $a_0$, $b_0$, $a_1$, and $b_1$. The logic circuit for the least significant bit position (logic circuit 40r) is coupled to receive the bits of the operand from the least significant bit position and the carry-in input.

In general, for each bit of the sum that is not the least significant bit, the bit may be zero for three conditions based on the propagate, generate, and kill terms for the bit position and the next less significant bit position. The propagate term is defined to be logical XOR of the bits input to that bit position (since a carry-in to that position would be propagated to the next more significant bit position if one of the operand bits is a one). The generate term is defined to be the logical AND of the bits input to that position (since a carry would be generated to the next more significant bit position if both operand bits are a one). The kill term is defined to be the logical NOR of the bits input to that position (since a carry-in would be killed (not propagated) to the next more significant bit position if both operand bits are a zero).

For bit position n (where n is not equal to r), the three conditions are: (i) if the propagate term is a one for bit position n, either the generate or propagate term for bit position n+1 is a one; (ii) if the generate term is a one for bit position n, the kill term is a one for bit position n+1; (iii) if the kill term is a one for bit position n, the kill term is a one for bit position n+1. The three conditions may be necessary but not sufficient conditions (since $C_{in}$ is not accounted for). Accordingly, the sum at bit position may be zero if the logical OR of the about three conditions is one. In equation form, where X(n) is the propagate term for bit position n, G(n) is the generate term for bit position n, and K(n) is the kill term for bit position n:

$$\text{sum\_is\_zero}(n) = X(n) \& (G(n+1) | X(n+1)) | (G(n) | K(n)) \& K(n+1)) \quad (1)$$

which reduces to $$\text{sum\_is\_zero}(n) = ((a_n \text{xor} b_n) \& (a_{n+1} | b_{n+1})) | ((a_n \text{xnor} b_n) \& (a_{n+1} \text{nor} b_{n+1})) \quad (2)$$

Each logic circuit 40 except logic circuit 40r implements the above logic for its bit position. For example, XOR gate 52a, OR gate 50a, and AND gate 54a in logic circuit 40a implement the first portion of equation (2) for bit position zero: ($a_n$ xor $b_n$) & ($a_{n+1} | b_{n|1}$). The XNOR gate 46A, NOR gate 44a, and AND gate 48a in the logic circuit 40a implement the second portion of equation (2) for bit position zero: ($a_n$ xnor $b_n$) & ($a_{n+1}$ nor $b_{n+1}$). The OR gate 56a completes the OR of the first portion and the second portion of equation (2). Other logic circuits 40 may be similar to the logic circuit 40a (e.g. the logic circuit 40i is shown in FIG. 3 to include the gates 44i, 46i, 48i, 50i, 52i, 54i, and 56i in a similar configuration to logic circuit 40a). However, the logic circuit 40r may not have a less significant bit position. Instead, the carry in is known ($C_{in}$) and thus may be used in place of the next less significant bit position bits. Thus, the $C_{in}$ bit is input to the AND gate 54r (along with the output of the of the XOR gate 52r). The $C_{in}$ bit is input to an inverter 58, the output of which is input to the AND gate 48r along with the output of the XNOR gate 44r. The outputs of the AND gates 48r and 54r are logically ORed (OR gate 56r) to produce the $Z_r$ signal.

Case (i) above occurs when the sum of the bits for bit position (n) is a one, and thus a carry-in of one from bit position n+1 is needed to have a zero result for bit position (n). A carry-in of one may occur if either the generate or propagate terms of bit position n+1 is a one, and may still result in a sum of zero in bit position n+1 as well. For cases (ii) and (iii) above, a carry-in of zero is needed from bit position n+1. This only occurs, and also results in a zero sum for position n+1, if position n+1 is the kill term (both input bits to position n+1 are zero).

For the least significant bit position r, the sum is zero if the carry in ($C_{in}$) is zero and the generate or kill term for bit position r is a one; or if the carry in is a one and the propagate term is a one. Thus:

$$\text{sum\_is\_zero}(r) = (G(r) | K(r) \& {\sim} C_{in}) | (X(r) \& C_{in}) \quad (3)$$

which reduces to $$\text{sum\_is\_zero}(r) = ((a_r \text{xnor} b_r) \& {\sim} C_{in}) | ((a_r \text{xor} b_r) \& C_{in}) \quad (4)$$

as implemented in logic circuit 40r.

The logic circuits 40a-40r may generate the result for the respective bit position using only the operand bits from the respective bit position and the next less significant bit position (or the respective bit position and the carry-in bit, for the logic circuit 40r). Thus, the logic may be relatively small and relative fast. The second logic circuit 42 (e.g. an (r+1) bit AND in FIG. 3) may combine the bit position results to generate the final result. If each bit position is a zero result, than the final result is zero also. The (r+1) bit AND may be implemented in and desired fashion (e.g. a hierarchy of gates). In one embodiment, the zero determiner 32 may be fabricated entirely in static logic.

It is noted that, while specific logic gates are shown in FIG. 3, any set of logic circuitry may be used to implement the zero determiner circuit 32 (including any Boolean equivalents of the gates shown). For example the OR gate 50a may be eliminated by taking the output of the NOR gate 44a and inverting it (or vice versa). The XOR gate 52a may be implemented by taking the output of the XNOR gate 46a and inverting it (or vice versa). The AND gates 54a and 48a and the OR gate 56a may be replaced by NAND gates. Additionally, the gates may be changed by changing the asserted level of the $Z_0$-$Z_r$ signals to zero and/or changing the asserted level of the zero sum signal to zero.

It is noted that, in some embodiments, $C_{in}$ may be a late arriving signal. To ease timing constraints, one implementation may provide two sets of logic, one assuming that $C_{in}$ is one and the other assuming $C_{in}$ is zero. The correct result may be muxed using the $C_{in}$ when it arrives. In another embodiment, the zero result may be computed across each bit position except bit position r (since other positions are not affected by the $C_{in}$ value). That is, the preliminary result may be logically the same as the output of the logical AND 42 (without $Z_r$). That preliminary result may be logically ANDed with the logical XOR of $a_r$ and $b_r$ (if $C_{in}$=1) or the logical XNOR of $a_r$ and $b_r$ (if $C_{in}$=0) to generate the Zero Sum output signal.

Turning next to FIG. 4, a block diagram of one embodiment of the ff determiner circuit 34 is shown. In the illustrated embodiment, the ff determiner circuit 34 includes a plurality of logic circuits 60a-60r and a second logic circuit 62. Specifically, there may be one logic circuit 60a-60r for each bit position in the result (and the source operands, in this embodiment). The logic circuit 60a-60r may detect whether or not a one result occurs for the respective bit position, assuming that each other bit position has a one result. The logic circuit 60a-60r may assert an output signal $O_0$-$O_r$ to the second logic circuit 62 to indicate that the one result is detected at that bit position. The second logic circuit 62 may combine the output signals $O_0$-$O_r$ to generate the ff sum signal. That is, the second logic circuit 42 may verify that each bit position is one. Assertion of the ff sum signal indicates that the sum generated by the adder 30 will be the ones result.

In FIG. 4, the bits of operand A are illustrated as "a" followed by a subscript indicating which bit position of the operand is provided (positions 0 through r). Similarly, bits of operand B are illustrated as "b" followed by a subscript indicating the bit position. Accordingly, as can be seen in FIG. 4, each logic circuit 60a-60r is coupled to receive the bit of each operand from the respective bit position and next less significant bit position. Thus, for example, logic circuit 60a corresponds to bit position 0 and thus receives $a_0$, $b_0$, $a_1$, and $b_1$. The logic circuit for the least significant bit position (logic circuit 60r) is coupled to the receive the bits of the operand from the least significant bit position and the carry-in input.

In general, for each bit of the sum that is not the least significant bit, the bit may be one for three conditions based on the propagate, generate, and kill terms for the bit position and the next less significant bit position. For bit position n (where n is not equal to r), the three conditions are: (i) if the propagate term is a one for bit position n, the kill or the propagate term for bit position n+1 is a one; (ii) if the generate term is a one for bit position n, the generate term is a one for bit position n+1; (iii) if the kill term is a one for bit position n, the generate term is a one for bit position n+1. The three conditions may be necessary but not sufficient conditions (since $C_{in}$ is not accounted for). Accordingly, the sum at bit position may be one if the logical OR of the about three conditions is one. In equation form:

$$\text{sum\_is\_one}(n) = X(n) \& (K(n+1)|X(n+1))|(G(n)|K(n)) \& G(n+1) \quad (5)$$

which reduces to $$\text{sum\_is\_one}(n) = ((a_r \text{xorb}_n) \& \sim(a_{n+1} \& b_{n+1}))|((a_r \text{xnorb}_n) \& (a_{n+1} \& b_{n+1})) \quad (6)$$

Each logic circuit 60 except logic circuit 60r implements the above logic for its bit position. For example, XOR gate 72a, NAND gate 70a, and AND gate 74a in logic circuit 60a implement the first portion of equation (6) for bit position zero: $(a_n \text{ xor } b_n) \& \sim(a_{n-1} \& b_{n+1})$. The XNOR gate 66A, AND gate 64a, and AND gate 68a in the logic circuit 60a implement the second portion of equation (2) for bit position zero: $(a_n \text{ xnor } b_n) \& (a_{n+1} \& b_{n+1})$. The OR gate 76a completes the OR of the first portion and the second portion of equation (6). Other logic circuits 60 may be similar to the logic circuit 60a (e.g. the logic circuit 60i is shown in FIG. 4 to include the gates 64i, 66i, 68i, 70i, 72i, 74i, and 76i in a similar configuration to logic circuit 60a). However, the logic circuit 60r may not have a less significant bit position. Instead, the carry in is known ($C_{in}$) and thus may be used in place of the next less significant bit position bits. Thus, the $C_{in}$ bit is input to the AND gate 68r (along with the output of the of the XNOR gate 66r). The $C_{in}$ bit is input to an inverter 70r, the output of which is input to the AND gate 74r along with the output of the XOR gate 72r. The $O_r$ signal.

Case (i) above occurs when the sum of the bits for bit position (n) is a one, and thus the carry-in from bit position n+1 needs to be zero to have a one result for bit position (n). A carry-in of zero from bit position n+1 may occur if either the kill or propagate terms of bit position n+1 is a one, and may still result in a sum of one in bit position n+1. For cases (ii) and (iii) above, a carry-in of one is needed from bit position n+1 because the sum of the bits for bit position n is zero. This only occurs, and also results in a one sum for position n+1, if position n+1 is the generate term (both input bits to position n+1 are one). For the n+1 position to also still have a one sum, the carry-in to n+1 also needs to be a one, which means that the position n+2 needs to be the generate term as well. This case is handled in the logic circuit 60 that corresponds to bit position n+1. That is, there is a logic circuit 60 for each bit position n, using the bits from the bit position n and the bit position n+1 to calculate one of the inputs to the logic circuit 62.

For the least significant bit position r, the sum is one if the carry in ($C_{in}$) is zero and the propagate term for bit position r is a one; or if the carry in is a one and the kill or generate term is a one. Thus:

$$\text{sum\_is\_one}(r) = (X(r) \& \sim C_{in})|((G(r)|K(r)) \& C_{in}) \quad (7)$$

which reduces to $$\text{sum\_is\_one}(r) = ((a_r \text{xnorb}_r) \& C_{in})|((a_r \text{xorb}_r) \& \sim C_{in}) \quad (8)$$

as implemented in logic circuit 60r.

The logic circuits 60a-60r may generate the result for the respective bit position using only the operand bits from the respective bit position and the next less significant bit position (or the respective bit position and the carry-in bit, for the logic circuit 60r). Thus, the logic may be relatively small and relative fast. The second logic circuit 62 (e.g. an (r+1) bit AND in FIG. 4) may combine the bit position results to generate the final result. If each bit position is a one result, than the final result is all ones. The (r+1) bit AND may be implemented in and desired fashion (e.g. a hierarchy of gates). In one embodiment, the ff determiner 34 may be fabricated entirely in static logic.

It is noted that, while specific logic gates are shown in FIG. 4, any set of logic circuitry may be used to implement the ff determiner circuit 34 (including any Boolean equivalents of the gates shown). For example the AND gate 64a may be eliminated by taking the output of the NAND gate 70a and inverting it (or vice versa). The XOR gate 72a may be implemented by taking the output of the XNOR gate 66a and inverting it (or vice versa). The AND gates 74a and 68a and the OR gate 76a may be replaced by NAND gates. Additionally, the gates may be changed by changing the asserted level of the $O_0$-$O_r$ signals to zero and/or changing the asserted level of the ff sum signal to zero.

It is noted that, similar to the above explanation with regard to FIG. 3, a late $C_{in}$ may be handled by precomputing the ones result over each bit position except bit position r, and combining the precomputed result with bit position r based on the $C_{in}$ input to generate the ones result. However, the preliminary result may be logically ANDed with the logical XNOR of $a_r$ and $b_r$ (if $C_{in}=1$) or the logical XOR of $a_r$ and $b_r$ (if $C_{in}=0$) to generate the ff Sum output signal.

FIGS. 3 and 4 illustrate mechanisms to detect a zero result and a ones result. Thus, generally, a result having the same state for each bit may be detected using circuitry similar to that shown.

Numerous variations and modifications will become apparent to those skilled in the art once the above disclosure is fully appreciated. It is intended that the following claims be interpreted to embrace all such variations and modifications.

What is claimed is:

1. A zero determiner for an adder, comprising:
 a plurality of logic circuits, wherein each logic circuit corresponds to a respective bit position of a result of the adder, and wherein a first logic circuit of the plurality of logic circuits corresponds to a least significant bit of the result and comprises:
  a first exclusive OR (XOR) logic gate and a first exclusive NOR (XNOR) logic gate coupled to receive a least significant bit of each operand of the adder and generate a first XOR result and a first XNOR result,
  a first inverter coupled to receive a carry-in input to the adder and to output an inverted carry-in,
  a first AND logic gate coupled to receive the carry-in input to the adder and the first XOR result and generate a first AND result,
  a second AND logic gate coupled to receive the inverted carry-in and the first XNOR result and generate a second AND result, and
  a first OR logic gate coupled to receive the first and second AND results and generate a first output signal; and
 wherein each remaining logic circuit of the plurality of logic circuits comprises:
  a second XOR logic gate and a second XNOR logic gate coupled to receive a respective bit from the respective bit position of each operand and generate a second XOR result and a second XNOR result,
  a second OR logic gate and a NOR logic gate coupled to receive a respective less significant bit adjacent to the respective bit position of each operand and generate a second OR result and a NOR result,
  a third AND logic gate coupled to receive the second XOR result and the second OR result and generate a third AND result,
  a fourth AND logic gate coupled to receive the second XNOR result and the NOR result and generate a fourth AND result, and
  a third OR logic gate coupled to receive the third and fourth AND results and generate a second output signal; and
 wherein each first and second output signal is indicative of whether a zero result occurs in the respective bit position of the result responsive only to inputs that the logic circuit is coupled to receive as recited previously; and
  a second logic circuit coupled to receive the output signals from the plurality of logic circuits and configured to generate a zero sum signal indicative, when asserted, that a zero result occurs for the adder, and wherein the second logic circuit is configured to assert the zero sum signal responsive to each of the output signals indicating zero.

2. The zero determiner as recited in claim 1 wherein the zero sum signal is asserted to one to indicate the zero result, and wherein each of the plurality of logic circuits is configured to assert the output signal to one to indicate the zero result in the respective bit position, and wherein the second logic circuit is configured to logically AND the output signals to generate the zero sum signal.

3. The zero determiner as recited in claim 1 wherein each remaining logic circuit comprises circuitry configured to detect that at least one of the adjacent less significant bits of the operands is a one and only one of the respective bits of the operands is a one.

4. The zero determiner as recited in claim 1 wherein each remaining logic circuit comprises circuitry configured to detect that the adjacent less significant bits of the operands are zero and the respective bits of the operand match.

5. A ones determiner for an adder, comprising:
 a plurality of logic circuits, wherein each logic circuit corresponds to a respective bit position of a result of the adder, and wherein a first logic circuit of the plurality of logic circuits corresponds to a least significant bit of the result and comprises:
  a first exclusive OR (XOR) logic gate and a first exclusive NOR (XNOR) logic gate coupled to receive a least significant bit of each operand of the adder and generate a first XOR result and a first XNOR result,
  a first inverter coupled to receive a carry-in input to the adder and to output an inverted carry-in,
  a first AND logic gate coupled to receive the inverted carry-in and the first XOR result and generate a first AND result,
  a second AND logic gate coupled to receive the carry-in input to the adder and the first XNOR result and generate a second AND result, and
  a first OR logic gate coupled to receive the first and second AND results and generate a first output signal; and
 wherein each remaining logic circuit of the plurality of logic circuits comprises:
  a second XOR logic gate and a second XNOR logic gate coupled to receive a respective bit from the respective bit position of each operand and generate a second XOR result and a second XNOR result,
  a NAND logic gate and a third AND logic gate coupled to receive a respective less significant bit adjacent to the respective bit position of each operand and generate a NAND result and a third AND result,
  a fourth AND logic gate coupled to receive the second XOR result and the NAND result and generate a fourth AND result,
  a fifth AND logic gate coupled to receive the second XNOR result and the third AND result and generate fifth AND result, and
  a second OR logic gate coupled to receive the fourth and fifth AND results and generate a second output signal; and
 wherein each first and second output signal is indicative of whether a one result occurs in the respective bit position of the result responsive only to inputs that the logic circuit is coupled to receive as recited previously; and
  a second logic circuit coupled to receive the output signals from the plurality of logic circuits and configured to generate a sum signal indicative, when asserted, that a one result occurs in each bit position of the result of the adder, and wherein the second logic circuit is configured to assert the sum signal responsive to each of the output signals indicating one.

6. The ones determiner as recited in claim 5 wherein the sum signal is asserted to one to indicate the ones result, and wherein each of the plurality of logic circuits is configured to assert the output signal to one to indicate the one result in the respective bit position.

7. The ones determiner as recited in claim 5 wherein each remaining logic circuit comprises circuitry configured to detect that each of the adjacent less significant bits of the operands is a one and that the respective bits of the operands match.

8. The ones determiner as recited in claim 5 wherein each remaining logic circuit comprises circuitry configured to detect that at least one of the adjacent less significant bits of the operands is zero and that only one of the respective bits of the operand is a one.

9. An execution core comprising:
an adder coupled to receive a first operand, a second operand, and a carry-in input, wherein the adder is configured to generate a sum of the first operand, the second operand, and the carry-in input; and
a zero detector coupled to receive the first operand, the second operand, and the carry-in input in parallel with the adder, wherein the zero detector comprises:
a plurality of logic circuits, wherein each logic circuit corresponds to a respective bit position of the sum, and wherein a first logic circuit of the plurality of logic circuits corresponds to a least significant bit of the sum and comprises:
a first exclusive OR (XOR) logic gate and a first exclusive NOR (XNOR) logic gate coupled to receive a least significant bit of the first operand and a least significant bit of the second operand and generate a first XOR result and a first XNOR result,
a first inverter coupled to receive the carry-in input and to output an inverted carry-in,
a first AND logic gate coupled to receive the carry-in input and the first XOR result and generate a first AND result,
a second AND logic gate coupled to receive the inverted carry-in and the first XNOR result and generate a second AND result, and
a first OR logic gate coupled to receive the first and second AND results and generate a first output signal; and
wherein each remaining logic circuit of the plurality of logic circuits comprises:
a second XOR logic gate and a second XNOR logic gate coupled to receive a respective bit from the respective bit position of each of the first operand and the second operand and generate a second XOR result and a second XNOR result,
a second OR logic gate and a NOR logic gate coupled to receive a respective less significant bit adjacent to the respective bit position of each of the first operand and the second operand and generate a second OR result and a NOR result,
a third AND logic gate coupled to receive the second XOR result and the second OR result and generate a third AND result,
a fourth AND logic gate coupled to receive the second XNOR result and the NOR result and generate a fourth AND result, and
a third OR logic gate coupled to receive the third and fourth AND results and generate a second output signal; and
wherein each first and second output signal is indicative of whether a zero result occurs in the respective bit position of the result responsive only to inputs that the logic circuit is coupled to receive as recited previously; and
a second logic circuit coupled to receive the output signals from the plurality of logic circuits and configured to generate a zero sum signal indicative, when asserted, that a zero result occurs for the adder, and wherein the second logic circuit is configured to assert the zero sum signal responsive to each of the output signals indicating zero.

10. The execution core as recited in claim 9 further comprising a ones detector coupled to receive the first operand, the second operand, and the carry-in input in parallel with the adder, wherein the ones detector comprises:
a plurality of third logic circuits, wherein each third logic circuit corresponds to a respective bit position of the sum, and wherein a given logic circuit of the plurality of third logic circuits corresponds to a least significant bit of the sum and comprises:
a third exclusive OR (XOR) logic gate and a third exclusive NOR (XNOR) logic gate coupled to receive a least significant bit of each of the first operand and the second operand and generate a third XOR result and a third XNOR result,
a second inverter coupled to receive the carry-in input and to output a second inverted carry-in,
a fifth AND logic gate coupled to receive the second inverted carry-in and the third XOR result and generate a fifth AND result,
a sixth AND logic gate coupled to receive the second carry-in input and the third XNOR result and generate a sixth AND result, and
a fourth OR logic gate coupled to receive the fifth and sixth AND results and generate a third output signal; and
wherein each remaining logic circuit of the plurality of third logic circuits comprises:
a fourth XOR logic gate and a fourth XNOR logic gate coupled to receive a respective bit from the respective bit position of each of the first operand and the second operand and generate a fourth XOR result and a fourth XNOR result,
a NAND logic gate and a seventh AND logic gate coupled to receive a respective less significant bit adjacent to the respective bit position of each of the first operand and the second operand and generate a NAND result and a seventh AND result,
an eighth AND logic gate coupled to receive the fourth XOR result and the NAND result and generate an eighth AND result,
a ninth AND logic gate coupled to receive the fourth XNOR result and the seventh AND result and generate ninth AND result, and
a fifth OR logic gate coupled to receive the eighth and ninth AND results and generate a fourth output signal; and
wherein each third and fourth output signal is indicative of whether
a one result occurs in the respective bit position of the sum responsive only to inputs that the third logic circuit is coupled to receive as recited previously; and
a fourth logic circuit coupled to receive the third and fourth output signals from the plurality of third logic circuits and configured to generate a fifth signal indicative, when asserted, that a one occurs in each bit position of the sum, and wherein the fourth logic circuit is configured to assert the fifth signal responsive to each of the third and fourth output signals indicating one.

11. A processor comprising:
a register file configured to store a first operand and a second operand; and
an execution core coupled to receive the first operand and the second operand from the register file, the execution core comprising:

an adder coupled to receive the first operand, the second operand, and a carry-in input, wherein the adder is configured to generate a sum of the first operand, the second operand, and the carry-in input; and a zero detector coupled to receive the first operand, the second operand, and the carry-in input in parallel with the adder, wherein the zero detector comprises:

a plurality of logic circuits, wherein each logic circuit corresponds to a respective bit position of the sum, and wherein a first logic circuit of the plurality of logic circuits corresponds to a least significant bit of the sum and comprises:

a first exclusive OR (XOR) logic gate and a first exclusive NOR (XNOR) logic gate coupled to receive a least significant bit of the first operand and a least significant bit of the second operand and generate a first XOR result and a first XNOR result, a first inverter coupled to receive the carry-in input and to output an inverted carry-in, a first AND logic gate coupled to receive the carry-in input and the first XOR result and generate a first AND result, a second AND logic gate coupled to receive the inverted carry-in and the first XNOR result and generate a second AND result, and a first OR logic gate coupled to receive the first and second AND results and generate a first output signal; and wherein each remaining logic circuit of the plurality of logic circuits comprises:

a second XOR logic gate and a second XNOR logic gate coupled to receive a respective bit from the respective bit position of each of the first operand and the second operand and generate a second XOR result and a second XNOR result, a second OR logic gate and a NOR logic gate coupled to receive a respective less significant bit adjacent to the respective bit position of each of the first operand and the second operand and generate a second OR result and a NOR result, a third AND logic gate coupled to receive the second XOR result and the second OR result and generate a third AND result, a fourth AND logic gate coupled to receive the second XNOR result and the NOR result and generate a fourth AND result, and a third OR logic gate coupled to receive the third and fourth AND results and generate a second output signal; and wherein each first and second output signal is indicative of whether a zero result occurs in the respective bit position of the result responsive only to inputs that the logic circuit is coupled to receive as recited previously; and a second logic circuit coupled to receive the output signals from the plurality of logic circuits and configured to generate a zero sum signal indicative, when asserted, that a zero result occurs for the adder, and wherein the second logic circuit is configured to assert the zero sum signal responsive to each of the output signals indicating zero.

12. The processor as recited in claim 11 wherein the execution core further comprising a ones detector coupled to receive the first operand, the second operand, and the carry-in input in parallel with the adder, wherein the ones detector comprises:

a plurality of third logic circuits, wherein each third logic circuit corresponds to a respective bit position of the sum, and wherein a given logic circuit of the plurality of third logic circuits corresponds to a least significant bit of the sum and comprises:

a third exclusive OR (XOR) logic gate and a third exclusive NOR (XNOR) logic gate coupled to receive a least significant bit of each of the first operand and the second operand and generate a third XOR result and a third XNOR result, a second inverter coupled to receive the carry-in input and to output a second inverted carry-in, a fifth AND logic gate coupled to receive the second inverted carry-in and the third XOR result and generate a fifth AND result, a sixth AND logic gate coupled to receive the second carry-in input and the third XNOR result and generate a sixth AND result, and a fourth OR logic gate coupled to receive the fifth and sixth AND results and generate a third output signal; and wherein each remaining logic circuit of the plurality of third logic circuits comprises:

a fourth XOR logic gate and a fourth XNOR logic gate coupled to receive a respective bit from the respective bit position of each of the first operand and the second operand and generate a fourth XOR result and a fourth XNOR result, a NAND logic gate and a seventh AND logic gate coupled to receive a respective less significant bit adjacent to the respective bit position of each of the first operand and the second operand and generate a NAND result and a seventh AND result, an eighth AND logic gate coupled to receive the fourth XOR result and the NAND result and generate an eighth AND result, a ninth AND logic gate coupled to receive the fourth XNOR result and the seventh AND result and generate ninth AND result, and a fifth OR logic gate coupled to receive the eighth and ninth AND results and generate a fourth output signal; and wherein each third and fourth output signal is indicative of whether a one result occurs in the respective bit position of the sum responsive only to inputs that the third logic circuit is coupled to receive as recited previously; and a fourth logic circuit coupled to receive the third and fourth output signals from the plurality of third logic circuits and configured to generate a fifth signal indicative, when asserted, that a one occurs in each bit position of the sum, and wherein the fourth logic circuit is configured to assert the fifth signal responsive to each of the third and fourth output signals indicating one.

13. The processor as recited in claim 11 wherein the execution core is further coupled to receive the carry-in input from the register file.

14. The processor as recited in claim 12 wherein the execution core further comprises a control unit coupled to receive the zero sum signal and the fifth signal, and coupled to receive an indication of the operation being performed, and wherein the control unit is configured to determine if the zero sum signal and the fifth signal are part of a result of the operation.

15. The processor as recited in claim 14 wherein the control unit is configured to forward an indication of the zero sum signal and the fifth signal if the signals are part of the result.

* * * * *